(12) United States Patent
Vander Griend

(10) Patent No.: US 8,056,868 B2
(45) Date of Patent: Nov. 15, 2011

(54) CONDUIT FOR VEHICLE SYSTEM COMPONENTS

(75) Inventor: Bennett L. Vander Griend, Woodinville, WA (US)

(73) Assignee: PACCAR Inc, Bellevue, WA (US)

( * ) Notice: Subject to any disclaimer, the term of this patent is extended or adjusted under 35 U.S.C. 154(b) by 332 days.

(21) Appl. No.: 11/840,835

(22) Filed: Aug. 17, 2007

(65) Prior Publication Data
US 2009/0045300 A1    Feb. 19, 2009

(51) Int. Cl.
*F16L 3/08* (2006.01)
(52) U.S. Cl. ........... 248/74.2; 24/455; 248/68.1; 248/73
(58) Field of Classification Search ............. 248/68.1, 248/74.2, 74.3, 230.1, 316.1, 316.5, 316.7, 248/231.61, 313; 24/455, 339, 483, 485; 174/154, 163 R
See application file for complete search history.

(56) References Cited

U.S. PATENT DOCUMENTS

| | | | |
|---|---|---|---|
| 1,984,232 A | 12/1934 | Peremi | |
| 3,163,712 A | 12/1964 | Cochran | |
| 3,517,702 A | 6/1970 | Mueller | |
| 3,654,049 A | 4/1972 | Ausnit | |
| 3,786,171 A | 1/1974 | Shira | |
| 3,913,187 A * | 10/1975 | Okuda | 24/484 |
| 3,980,263 A | 9/1976 | Okuda | |
| 4,317,262 A | 3/1982 | Wells, Jr. | |
| 4,439,896 A | 4/1984 | Matsui | |
| 4,457,482 A * | 7/1984 | Kitagawa | 248/74.3 |
| 4,609,171 A | 9/1986 | Matsui | |
| 4,657,284 A * | 4/1987 | Fiori | 285/39 |
| 4,700,913 A | 10/1987 | Hirano | |
| 4,881,705 A * | 11/1989 | Kraus | 248/74.2 |
| 4,942,271 A | 7/1990 | Corsi | |
| 4,944,976 A | 7/1990 | Plummer, III | |
| 5,235,136 A | 8/1993 | Santucci | |
| 5,257,768 A * | 11/1993 | Juenemann et al. | 248/604 |
| 5,277,387 A * | 1/1994 | Lewis et al. | 248/74.2 |
| 5,505,230 A | 4/1996 | Bartholomew | |
| 5,626,316 A * | 5/1997 | Smigel et al. | 248/68.1 |
| 5,669,590 A * | 9/1997 | Przewodek | 248/68.1 |
| 6,029,713 A | 2/2000 | Miranda | |
| 6,209,827 B1 | 4/2001 | Kawai | |
| 6,601,802 B1 | 8/2003 | Howe | |
| 6,604,715 B2 | 8/2003 | Howe | |
| 6,641,093 B2 | 11/2003 | Coudrais | |
| 6,810,191 B2 | 10/2004 | Ferris | |
| 6,899,304 B2 | 5/2005 | Bellmore | |
| 6,934,456 B2 | 8/2005 | Ferris | |
| 6,978,973 B1 * | 12/2005 | Gretz | 248/74.1 |
| 7,451,579 B2 * | 11/2008 | Azarin | 248/74.3 |
| 2006/0029465 A1 * | 2/2006 | Auer | 403/383 |

* cited by examiner

*Primary Examiner* — Tan Le
(74) *Attorney, Agent, or Firm* — Christensen O'Connor Johnson Kindness PLLC

(57) ABSTRACT

A conduit section for holding routing components constructed in accordance with one embodiment of the present disclosure is provided. The conduit section includes a double-walled structure having an attachment portion and a clip portion. A hinge is integrally formed within the double-walled structure for hingedly connecting the clip portion to the attachment portion. The clip portion is adapted to be reciprocated about the hinge between an open and closed position, and the hinge is adapted to bias the clip portion into one of the open and closed positions.

12 Claims, 5 Drawing Sheets

A conduit section for holding routing components constructed in accordance with one embodiment of the present disclosure is provided. The conduit section includes a double-walled structure having an attachment portion and a clip portion. A hinge is integrally formed within the double-walled structure for hingedly connecting the clip portion to the attachment portion. The clip portion is adapted to be reciprocated about the hinge between an open and closed position, and the hinge is adapted to bias the clip portion into one of the open and closed positions.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

CONDUIT FOR VEHICLE SYSTEM COMPONENTS

BACKGROUND

Machine or system components are typically placed into communication with other components or systems via routing components, such as wires, cables, pipes, etc. For instance, the electrical components of a heavy duty truck are often placed into electrical communication with other truck electrical components. The routing components are often secured to various locations of the truck, such as the frame rail.

The routing components are normally bundled together and thereafter secured to the frame rail with ties, clips or clamps, or other suitable devices. Ties and wraps are normally inexpensive; however, the tie or wrap must normally be replaced each time a new routing component is added to the bundle or a routing component needs to be serviced. Clips (or clamps) can be opened to add or remove components or service components; however, clips are typically more expensive than ties since they normally include multiple parts and are therefore more difficult to manufacture. A clip is also often unsuitable for use in a high-heat, dynamic environment, such as on the frame rail of a truck. Moreover, the clips are often not adapted to receive bundles of various sizes. The bundled components must be tightly received within the clip to prevent the components from chafing against other components or against the inner walls of the clip when the truck vibrates.

Typically, bundled components are placed within a clip in the open position, and the clip is then closed to secure the components therewithin. If many components need to be added to the clip, the overall truck assembly time necessarily increases if the clip needs to be held open or re-opened each time a routing component is loaded into the clip. The clip is normally closed with a latching device. However, the opening in the latching device is normally exposed to debris, fluids, thermal stress, and dynamic stress, causing it to weaken and eventually fail over time. If the latch fails, the clip can open and allow the routing components to separate from the vehicle.

It is therefore desirable to have a device for securing routing components to a vehicle that is easy to manufacture, that is suitable for use in a stressful environment, that tightly secures the routing components to the frame, that allows the routing components to be easily loaded and unloaded from the device, and that will secure the routing components to the frame in the event that the latch fails.

SUMMARY

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

The claimed embodiments of the present disclosure will now be described with reference to the drawings where like numerals correspond to like elements. Although exemplary embodiments of the present disclosure will be described hereinafter with reference to heavy duty trucks, it will be appreciated that aspects of the described embodiments have wide application, and may be suitable for other uses. Accordingly, the following descriptions and illustrations herein should be considered illustrative in nature, and thus, not limiting the scope of the present disclosure and the appended claims.

Figure 1:
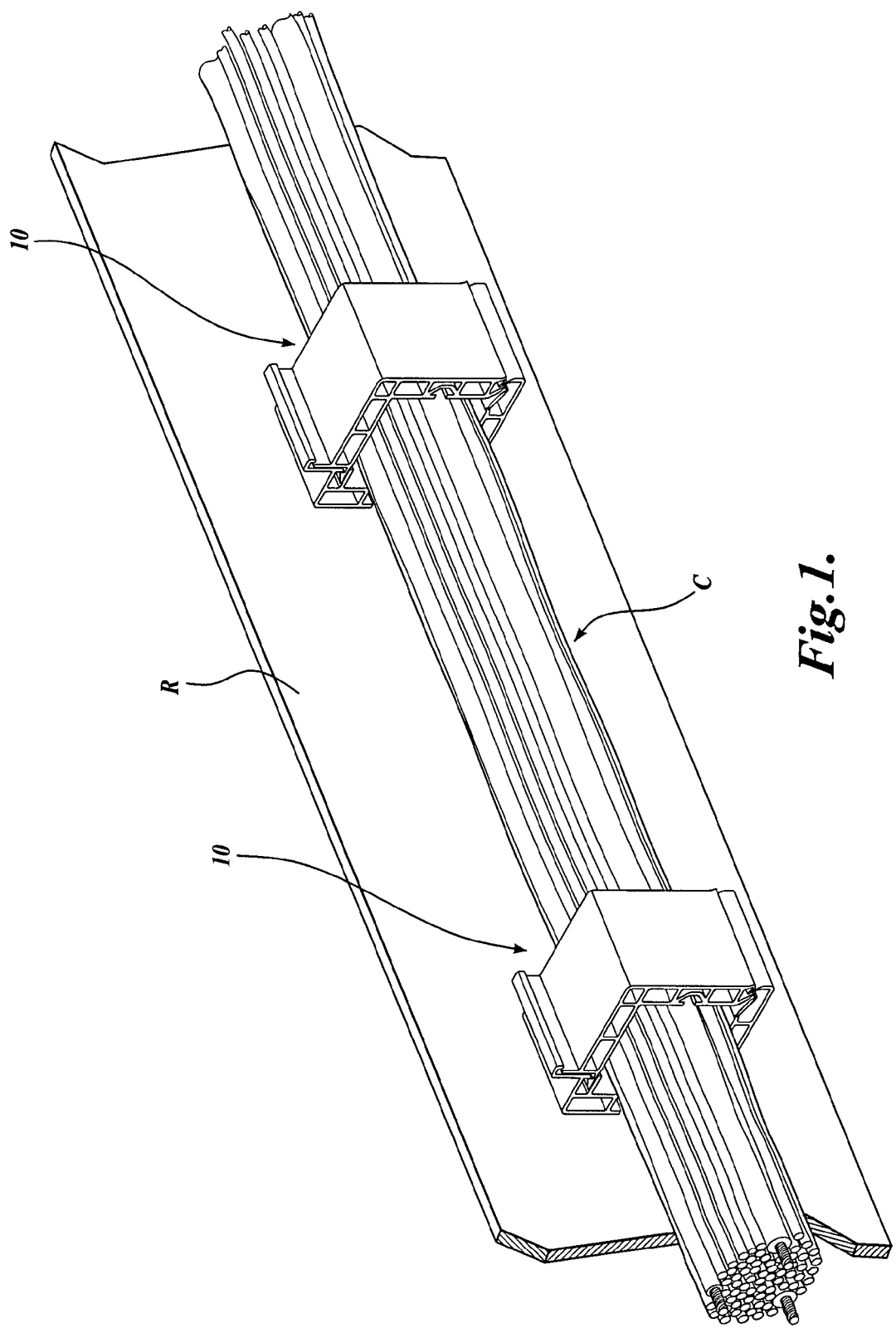
FIG. 1 is an environmental view of a representative embodiment of conduit sections constructed in accordance with aspects of the present disclosure, wherein the conduit sections are secured to a vehicle frame rail.

A conduit section 10 constructed in accordance with one embodiment of the present disclosure is best seen by referring to FIG. 1. The conduit section 10 is shown mounted to a vehicle frame rail R of a heavy duty truck (not shown) for containing or securing vehicle systems cabling or other routing components C to the truck frame rail R. It should be appreciated that the conduit section 10 may be used for other applications, such as for securing the wiring of a computer or other electrical device to a wall in a home.

Figure 2:
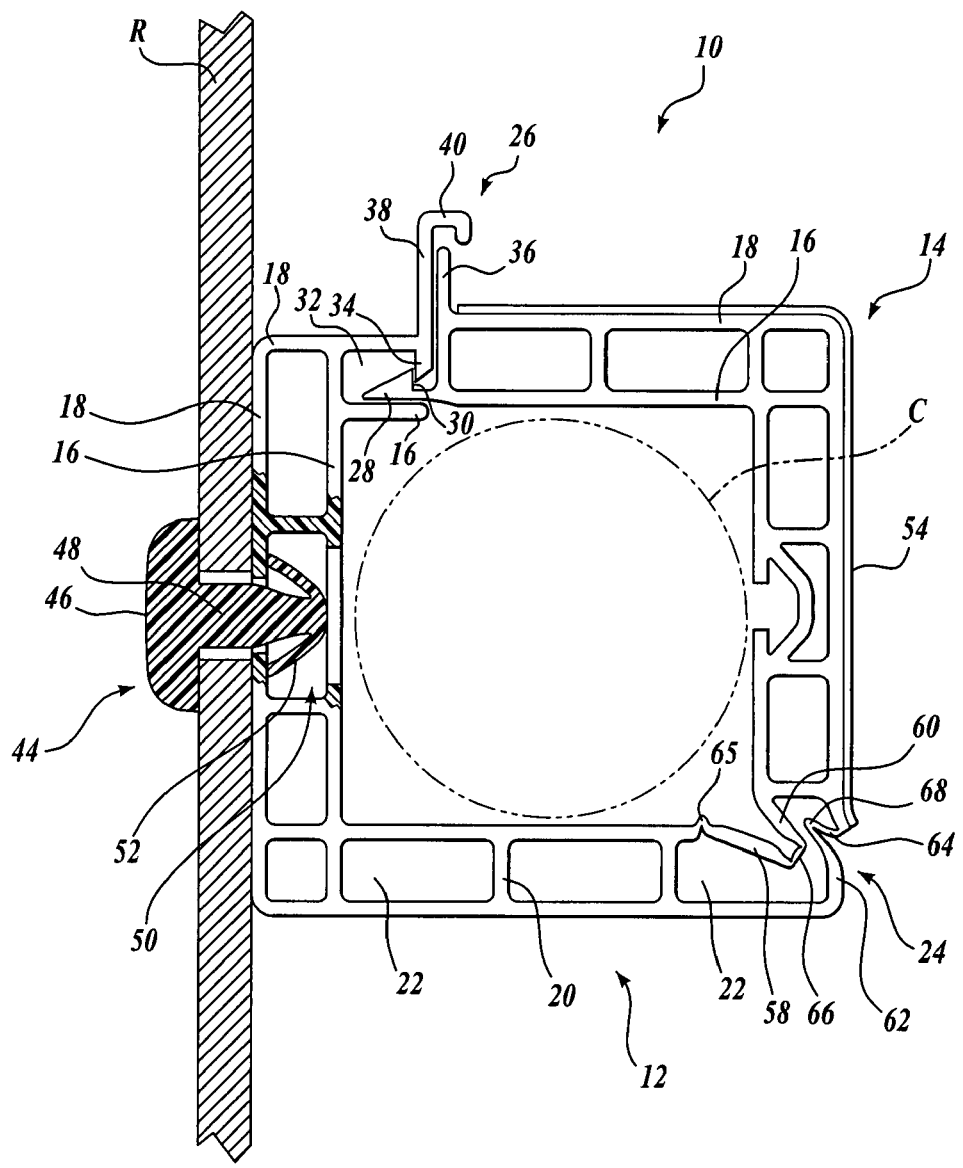
FIG. 2 is a partial side sectional view of a conduit section of FIG. 1, wherein the conduit section is in the closed position.

Referring to FIG. 2, the conduit section 10 will now be described in detail. The conduit section 10 is an extruded, double-walled structure formed from any well-known semi-deformable, heat-resistant, durable material such as polyethylene, nylon, etc. In this manner, the conduit section 10 will not melt or deform when exposed to certain heat-generating components of the truck, such as engine components. The double-walled structure is also sufficiently durable such that it can withstand the effects of debris, vibration, and other environmental stress. The length of the conduit section 10 can be varied to accommodate full enclosure of the routing components C or can be shortened to enclose only a portion of the routing components C.

The double-walled structure of the conduit section 10 is defined by an outer wall 18 and an inner wall 16 that are substantially similar in cross-sectional shape, wherein the inner wall 16 is concentrically disposed within the outer wall 18. The inner and outer walls 16 and 18 are spaced apart by a plurality of dividing members 20 transversely disposed therebetween. The dividing members 20 define a plurality of longitudinal channels 22 that extend along the length of the conduit section 10. The channels 22 provide a barrier that helps resist thermal convection, thereby insulating the routing components C disposed within the conduit section 10. At least some of the channels 22 may be filled with a suitable insulating foam material, such as polyurethane, to resist thermal conduction and further protect the routing components C. Additional thermal protection can be provided by applying an optional reflective surface or layer 54 to the outer conduit wall 18 in areas exposed to high thermal radiation, if desired.

The conduit section 10 is formed in any suitable cross-sectional shape, such as square, round, rectangular, or of an irregular shape. As shown in the embodiment of FIG. 2, the conduit section 10 is substantially square in cross-section and includes an attachment portion 12 and a clamp or clip portion 14. The attachment portion 12 is defined by at least one straight portion or side of the square-shaped conduit section 10 such that it is adapted to engage and be secured to the frame rail R or another suitable structure. The clip portion 14 is hingedly connected to the attachment portion 12 for providing a means to open and close the conduit section 10.

Figure 3:
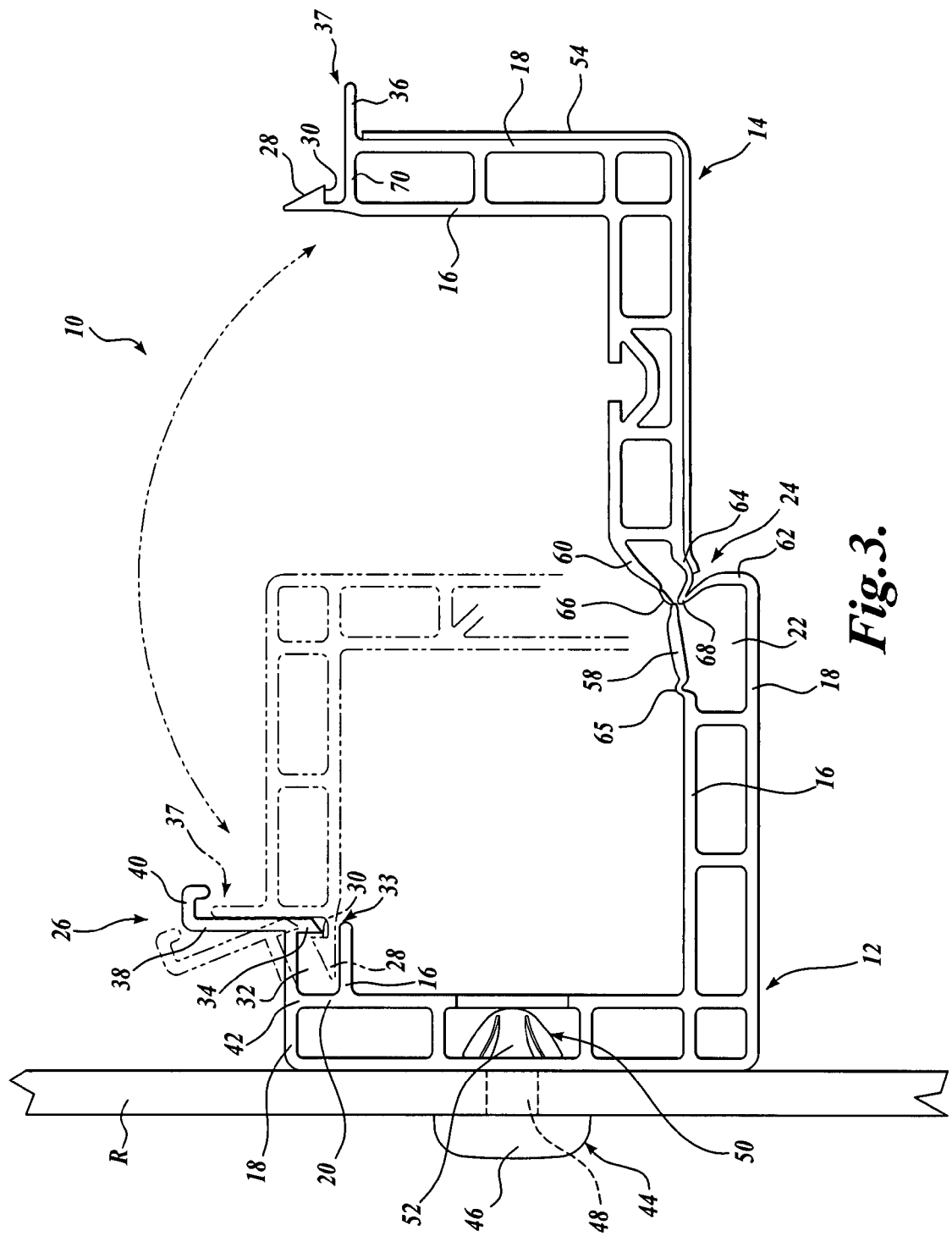
FIG. 3 is a side view of a conduit section of FIG. 1, wherein the conduit section is in the open position.

As can best be seen by referring to FIGS. 2 and 3, a hinge 24 is preferably formed in a corner of the conduit section 10 such that the attachment portion 12 is formed by two adjacent sides of the conduit section 10, and the clip portion 14 is formed by two adjacent sides of the conduit section 10. The hinge 24 is depicted as an over-center hinge integrally formed within the inner and outer walls 16 and 18 in a corner of the conduit section 10.

The over-center hinge 24 is designed to urge the clip portion 14 into or out of the open or closed position. More specifically, when the conduit section 10 is opened by rotating the clip portion 14 about hinge 24, the hinge 24 urges the clip portion 14 into the open position once the clip portion has been rotated more than half-way into the open position. Similarly, if the clip portion 14 is rotated more than half-way into the closed position, the hinge 24 urges the clip portion 14 into the closed position. When moved into the closed position, a closing mechanism, or latch mechanism 26 secures the clip portion 14 to the attachment portion 12. The hinge 24 also functions as an auxiliary closing mechanism by preventing the conduit section 10 from opening if the latch mechanism 26 is damaged. The hinge 24 continuously urges the clip portion 14 into the closed position until a sufficient force is applied to the clip portion 14 to open the conduit section 10. It should be appreciated that any suitable hinge mechanism may be used, and an auxiliary closing means may instead be formed elsewhere on the conduit section 10. For instance, the conduit section 10 may include an elastic member that extends between the attachment portion 12 and the clip portion 14 to bias the clip portion 14 into the closed position.

Although the inner and outer walls 16 and 18 of the conduit section 10 may be formed in any suitable manner to define the over-center hinge 24, an exemplary embodiment shown in FIGS. 2 and 3 depicts a hinge 24 having a first inner hinge portion 58 connected to a portion of the inner wall 16 through a first inner flexible hinge 65. The first inner hinge portion 58 is hingedly connected to a second inner hinge portion 60 through a second inner flexible hinge 66. The outer wall 18 also includes a first outer hinge portion 62 that is hingedly connected to a second outer hinge portion 64 through an outer flexible hinge 68. The hinges 65, 66, and 68 are defined by thinned-down portions at the intersection of the inner wall 16 and the first inner hinge portion 58, the intersection of the first and second inner hinge portions 58 and 60, and the intersection of the first and second outer hinge portions 62 and 64, respectively.

Referring to FIG. 2, when the clip portion 14 is in the closed position, the first and second inner hinge portions 58 and 60 extend into the channel 22 defined at the corner of the conduit section 10. Likewise, the first and second outer hinge portions 62 and 64 extend at least partially into the channel 22 defined at the corner of the conduit section 10. The flexible hinges 65, 66, and 68 define hinge lines that run along the length of the conduit section 10. The hinge lines of each hinge 65, 66, and 68 define an axis of rotation about which the clip portion 14 may be rotated into or out of the open or closed position.

When the clip portion 14 is moved into the closed position, the clip portion 14 is secured to the attachment portion 12 through the latch mechanism 26. The latch mechanism 26 is integrally formed within the conduit section 10 such that a portion of the latch mechanism 26 is formed within the attachment portion 12, and a portion of the latch mechanism 26 is formed within the clip portion 14. Referring to FIG. 3, a latch 28 extends outwardly from the clip portion 14 along the inner wall 16, wherein the latch 28 is tapered near its forward end. The latch 28 includes a latch shoulder 30 formed at its non-tapered end that is substantially transverse to the inner wall 16. An end dividing member 70 couples the inner wall 16 to the outer wall 18 in a substantially transverse manner at the end of the clip portion 14. A closure member 36 extends upwardly from the outer wall 18 of the clip portion 14 and is substantially aligned with the end dividing member 70. The end dividing member 70 and closure member 26 cooperatively define an abutment end 37 for engaging the attachment portion 12 in the closed position.

The latch mechanism 26 further includes a latch-receiving cavity 32 formed in the attachment portion 12 and defined by a section of the outer wall 18, a section of the inner wall 16, and a dividing member 20. A latch protrusion 34 extends partially downwardly and transversely from the outer wall 18 in front of the cavity 32. The latch protrusion 34 and inner wall 16 define a latch opening 33 that is sized to forcibly receive the latch 28. At least a portion of the latch protrusion 34 is tapered on its outer surface such that the tapered portion of the latch 28 slides against the tapered portion of the latch protrusion 34 as the clip portion 14 is moved into the closed position.

The latch mechanism 26 further includes a release lever 38 that extends upwardly from the outer wall 18 and is aligned with the latch-receiving protrusion 34. A debris shield 40 is formed on the upper end of the release lever 38. The debris shield 40 extends outwardly toward the clip portion 14 and is substantially J-shaped in cross section. When the clip portion 14 is moved into the closed position and the latch 28 is received within the latch-receiving cavity 32, the abutment end 37 of the clip portion 14 abuts the release lever 38 such that the clip portion 14 is substantially sealed against the attachment portion 12. Moreover, the debris shield 40 is positioned above the closure member 37 to substantially prevent any moisture, dirt, or other debris from entering the conduit section 10 through the latch mechanism 26.

To open the conduit section 10, a force is applied to the release lever 38 to move the release lever 38 in a direction opposite the clip portion 14, as shown in FIG. 3. As the release lever 38 is moved away from the clip portion 14, the release lever 38, the latch-receiving protrusion 34, and a portion of the outer wall 18 are moved in a substantially counterclockwise direction about a pivot point 42 defined by the joinder of the outer wall 18 and a dividing member 20 (the dividing member 20 defining a portion of the latch-receiving cavity 32). As the lever 38 and latch-receiving protrusion 34 are moved counterclockwise, the latch opening 33 enlarges and the latch 28 is pulled outwardly from the latch-receiving cavity 32 without the latch shoulder 30 engaging the latch-receiving protrusion 34. The clip portion 14 can thereafter be rotated about the hinge 24 into an open position.

To close the conduit section 10, the clip portion 14 is rotated about the hinge 24 until the latch 28 slides against the latch protrusion 34. The latch protrusion 34 is urged slightly inwardly by the force of the latch 28, and the latch 28 is received within the latch-receiving cavity 32. When the latch 28 is received within the latch-receiving cavity 32, the inside surface of the latch-receiving protrusion 34 is positioned to engage the latch shoulder 30. In this manner, the shoulder 30 will engage the latch-receiving protrusion 34 when the latch 28 is pulled outwardly from the latch-receiving cavity 32, thereby preventing any unintended release of the latch 28.

The attachment portion 12 may be secured to the frame rail R in any suitable manner, such as with a fastener, with an adhesive, or with any other suitable device. As shown in FIG. 2, a one-way, self-locking retention pin 44 is used to secure the conduit section 10 to the frame rail R. The retention pin 44 includes a head 46 formed on one end of a shaft 48 and a self-locking portion 50 having expandable flaps 52 formed on the other end of the shaft 48. To use the retention pin 44, the flaps 52 are positioned against the shaft 48, and the self-locking portion 50 and shaft 48 are thereafter passed through an opening in the frame rail R. The opening is sized such that the head 46 abuts the outer surface of the frame rail R. The self-locking portion 50 passes through the frame rail R and into an opening in the outer wall 18 of the attachment portion 12 of the conduit section 10. The self-locking portion 50 is sized such that it is received within a channel 22 in the attachment portion 12. After the self-locking portion 50 is received within the channel 22, the flaps 52 are urged outwardly into their original position, thereby preventing the self-locking portion 50 from being pulled back through the opening in the outer wall 18. As such, the retention pin 44 secures the conduit section 10 to the frame rail R.

Figure 4:
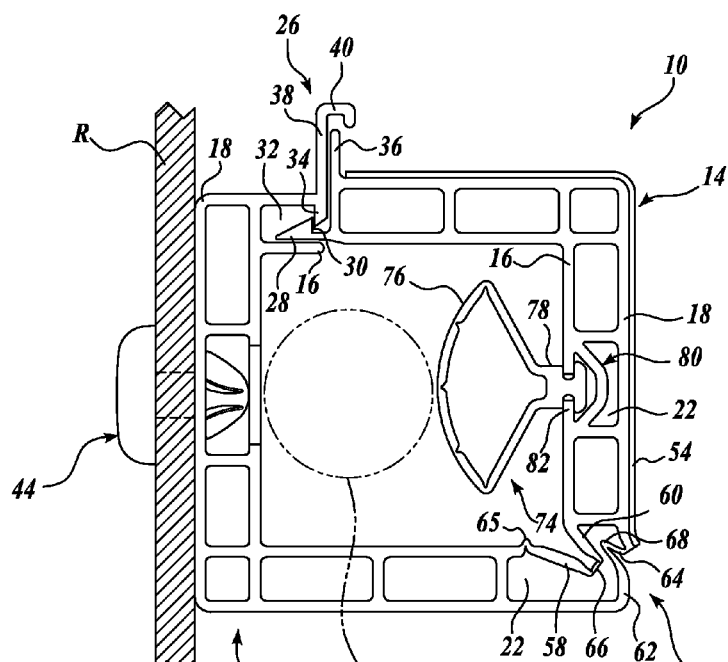
FIG. 4 is a side view of a conduit section of FIG. 1 in the closed position, wherein a first biasing member is coupled to the inner wall of the conduit section.

Referring to FIG. 4, the conduit section 10 includes an optional first biasing member 74 that is securable within the conduit section 10 to positively locate routing components C when the routing components C do not substantially fill the conduit interior. The first biasing member 74 locates each component C preferentially against the inner wall 16 of the conduit section 10 or against other components C to prevent chafing of the component C in high vibration environments.

In the embodiment shown, the first biasing member 74 includes a deformable head 76 and a shaft 78 extending therefrom. The head 76 is formed from a suitably semi-deformable material, such as plastic or rubber. The head 76 includes a curved portion that is convex in cross-section, wherein the curved portion is deformable or bendable inwardly when engaging a routing component C. The head 76 urges the routing component C towards the other routing components C or against the inner wall 16 of the conduit section 10 to tightly package the routing component C within the conduit. At the same time, the head 76 sufficiently deforms so as not to damage the routing component C.

The first biasing member 74 is removably mountable to the interior of the conduit section 10. A shaft-receiving cavity 80 is formed within the inner wall 16 of the conduit section 10 and extends into a channel 22 located between the inner and outer walls 16 and 18 of the conduit section 10. The cavity opening is defined by an annular lip 82 that is adapted to fit within a corresponding annular groove (not shown) formed on the shaft 78 of the first biasing member 74. To secure the first biasing member 74 to the interior of the conduit section 10, the shaft 78 is snap-fit within the shaft-receiving cavity 80 such that the annular lip 82 is received within the annular groove of the shaft 78.

Figure 5:
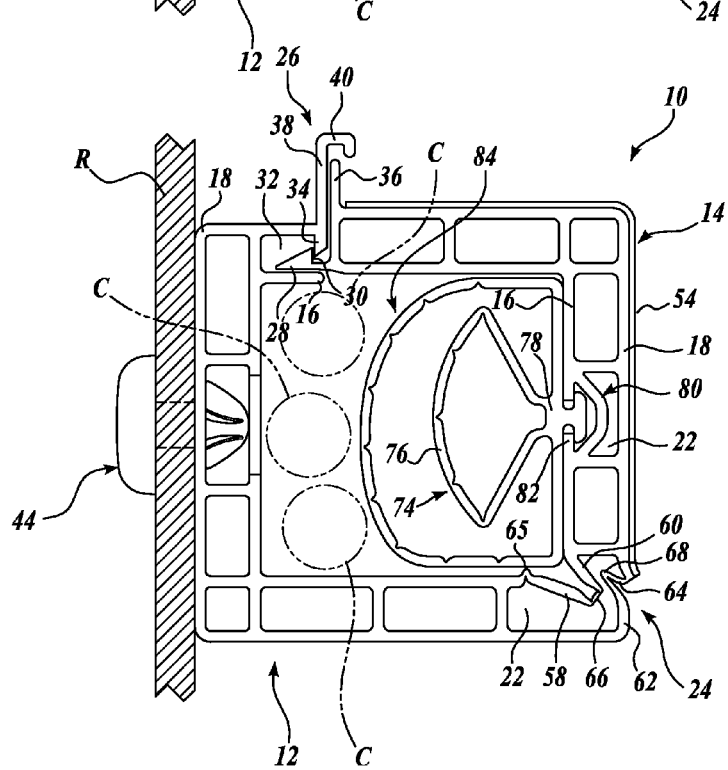
FIG. 5 is a side view of the conduit section of FIG. 1 in the closed position, wherein first and second biasing members are coupled to the inner wall of the conduit section.

Referring to FIG. 5, a larger second biasing member 84 may be used in addition to or instead of the first biasing member 74 when additional pressure is needed to secure the routing component within the conduit section 10. The second biasing member 84 is shown coupled to the shaft 78 and surrounds the first biasing member 74. The second biasing member 84 is positioned relative to the first biasing member 74 such that it projects further into the conduit section 10 and is spaced a predetermined distance from the head 76 of the first biasing member 74. It should be appreciated that the first or second biasing member may instead be used independently of the other. For instance, the first biasing member 74 may be used to secure larger components C within the conduit section 10, while the second biasing member 84 may instead be used to secure smaller components C within the conduit section 10. It should also be appreciated that the biasing members may be any suitable shape and size to effectively secure the routing components C within the conduit section 10.

The conduit section 10 may be formed in any suitable manner well-known in the art. For instance, the conduit section 10 may be formed by molding, casting, or other known methods. In the embodiments disclosed, the conduit section 10 is at least partially formed by extrusion. The conduit section 10 may be formed by extrusion of one or more plastic or polymeric materials into a longitudinal conduit that is sliced or cut into conduit sections 10 of a preferred length. It is preferable that the longitudinal conduit have a continuous cross-section as it exits the extruder (not shown). Moreover, it is preferred that the sliced pieces of the longitudinal conduit are in the configuration of the conduit section 10 without having to further shape or process the structure to form the conduit section 10. However, it should be appreciated that further shaping steps may be taken as needed, for instance, to shape the hinge 24 or other parts of the conduit section 10.

The outer wall 18, inner wall 16, and dividing members 20 may be extruded together in any suitable manner well known in the art. If a foam filler material or reflective outer layer 54 is used, the foam and reflective layer may be co-extruded along with the walls 16 and 18 and dividing members 20, or may instead be added to the conduit section 10 after the walls 16 and 18 are formed. It should be appreciated that the conduit section 10 may instead be formed without dividing members 20 such that the entire area between the outer wall 18 and the inner wall 16 is filled with a foam material.

Figure 6:
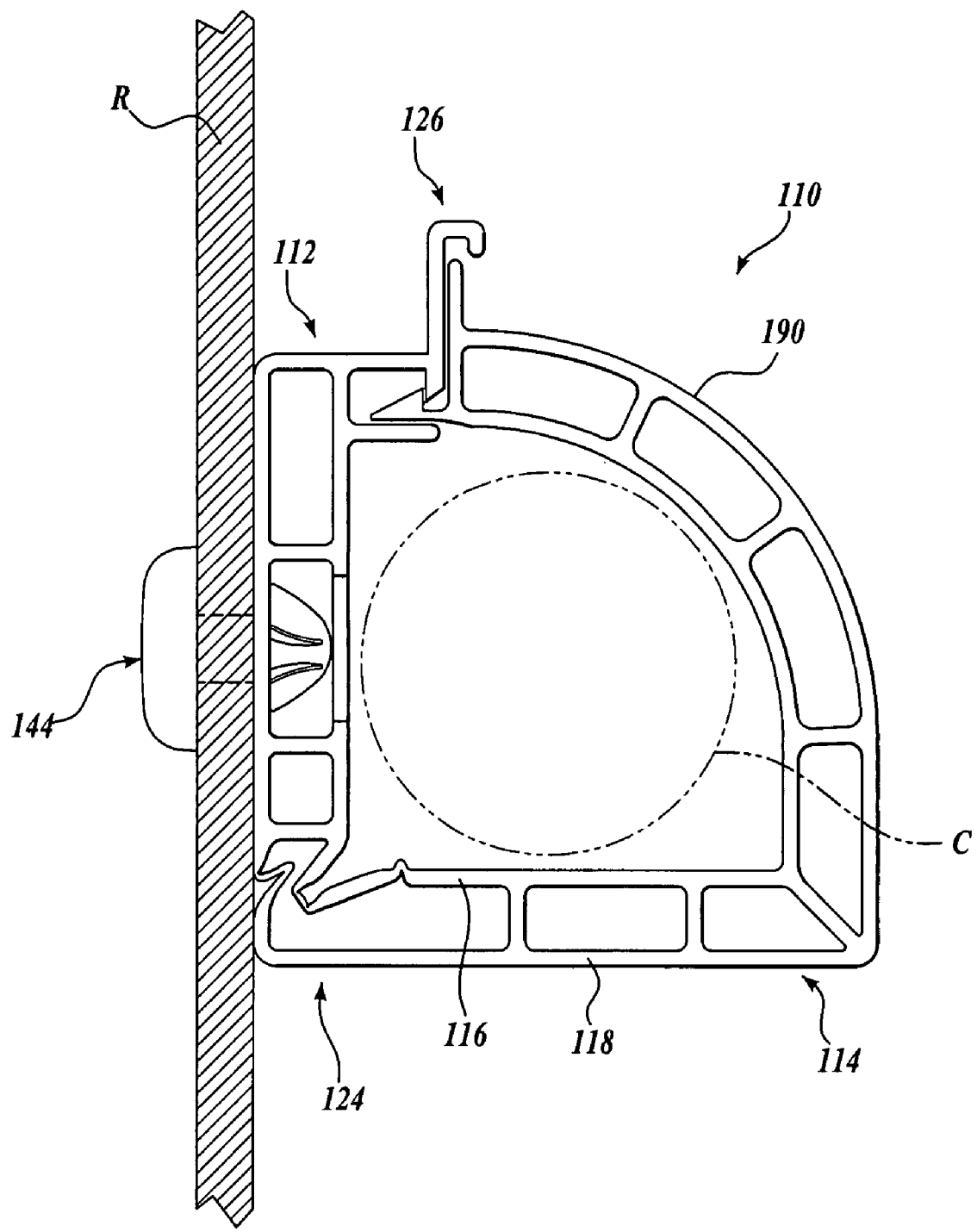
FIG. 6 is an alternate embodiment of a conduit section constructed in accordance with aspects of the present disclosure.

Referring now to FIG. 6, an alternate embodiment of a conduit section 110 is depicted. The conduit section 110 is substantially identical to the conduit section 10 described above except that the conduit is not square-shaped in cross-section. Rather, the conduit section 110 includes a clip portion 114 having a curved section 190. Although the conduit section 110 is shown having a curved section 190, it should be appreciated that the conduit section 110 may instead take the form of any suitable cross-sectional shape. Moreover, FIG. 6 depicts the hinge 124 formed in a different corner of the conduit section 110. It should be appreciated that the hinge 124 may be formed in any portion of the conduit section 110 to hingedly connect the attachment portion 112 to the clip portion 114.

While illustrative embodiments have been illustrated and described, it will be appreciated that various changes can be made therein without departing from the spirit and scope of the present disclosure.

The embodiments of the invention in which an exclusive property or privilege is claimed are defined as follows:

1. A conduit section for holding routing components, the conduit section comprising:
    (a) a double-walled structure having an inner wall and an outer wall, the double-walled structure defining an attachment portion and a clip portion, wherein the double-walled structure extends along substantially the entire length of the attachment portion and the clip portion; and
    (b) a hinge defined by a flexible portion of the inner wall and a flexible portion of the outer wall for hingedly connecting the clip portion to the attachment portion, wherein the clip portion is adapted to be reciprocated about the hinge between an open and a closed position, wherein when the clip portion reciprocates about the hinge, the flexible portions of the inner and outer wall bend to accommodate the movement of the clip portion, and wherein the hinge is adapted to bias the clip portion into both the open and closed positions; and
    (c) a receptacle formed within the double-walled structure configured to removably secure at least one of first and second biasing members to the double-walled structure, wherein the first biasing member is of a first size and configuration to engage one or more routing components of a first size and urge the one or more routing components of a first size into engagement with at least a portion of the inner wall of the double-walled structure, and wherein the second biasing member is of a second size and configuration to engage one or more routing components of a second size and urge the one or more routing components of a second size into engagement with at least a portion of the inner wall of the double-walled structure.

2. The conduit section of claim 1, further comprising a closing mechanism that releasably secures the clip portion to the attachment portion when the clip portion is in the closed position.

3. The conduit section of claim 1, further comprising a reflective layer formed on at least a portion of the outer wall of the double-walled structure.

4. The conduit section of claim 1, further comprising a filler material disposed between the inner wall and the outer wall of the double-walled structure or portions thereof.

5. The conduit of claim 1, wherein a corner is defined in the double-walled structure between the attachment portion and the clip portion.

6. The conduit section of claim 1, wherein the first and second biasing members are defined at least in part by a deformable head having a curved portion that is substantially convex in cross-section, the curved portion deformable inwardly when engaging a routing component.

7. A conduit section for securing routing components to a vehicle component, the conduit section comprising:
    (a) an extruded double-walled structure having an inner wall and an outer wall, the double-walled structure defining an attachment portion and a clip portion, wherein the double-walled structure extends along substantially the entire length of the attachment portion and the clip portion, and wherein the attachment portion is adapted to be secured to the vehicle component;
    (b) a hinge defined by a flexible portion of the inner wall and a flexible portion of the outer wall for hingedly connecting the clip portion to the attachment portion, wherein the clip portion is adapted to be reciprocated about the hinge between an open and a closed position, wherein when the clip portion reciprocates about the hinge, the flexible portions of the inner and outer wall bend to accommodate the movement of the clip portion, and wherein the hinge is adapted to bias the clip portion into both the open and closed positions;
    (c) a closing mechanism that releasably secures the clip portion to the attachment portion when the clip portion is in the closed position; and
    (d) a receptacle formed within the double-walled structure configured to removably secure at least one of first and second biasing members to the double-walled structure, wherein the first biasing member is of a first size and configuration to engage one or more routing components of a first size and urge the one or more routing components of a first size into engagement with at least a portion of the inner wall of the double-walled structure, and wherein the second biasing member is of a second size and configuration to engage one or more routing components of a second size and urge the one or more routing components of a second size into engagement with at least a portion of the inner wall of the double-walled structure.

8. The conduit section of claim 7, further comprising a reflective layer formed on at least a portion of the outer wall of the double-walled structure.

9. The conduit section of claim 7, further comprising a filler material disposed between the inner wall and the outer wall of the double-walled structure or portions thereof.

10. The conduit section of claim 7, wherein the closing mechanism includes a debris shield for substantially preventing any debris from entering the conduit section.

11. The conduit section of claim 10, wherein the debris shield defines a release lever for the closing mechanism.

12. The conduit section of claim 7, wherein the first and second biasing members are defined at least in part by a deformable head having a curved portion that is substantially convex in cross-section, the curved portion deformable inwardly when engaging a routing component.

* * * * *